United States Patent
Balachandran et al.

(10) Patent No.: US 10,314,103 B2
(45) Date of Patent: Jun. 4, 2019

(54) EXCHANGING PATTERNS OF SHARED RESOURCES BETWEEN MACHINE-TYPE AND HUMAN TRAFFIC

(71) Applicant: Telefonaktiebolaget LM Ericsson (publ), Stockholm (SE)

(72) Inventors: Kumar Balachandran, Pleasanton, CA (US); Konstantinos Dimou, San Francisco, CA (US); Muhammad Kazmi, Bromma (SE); Anders Wallén, Ystad (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 194 days.

(21) Appl. No.: 15/027,028

(22) PCT Filed: Oct. 3, 2014

(86) PCT No.: PCT/SE2014/051149
§ 371 (c)(1),
(2) Date: Apr. 4, 2016

(87) PCT Pub. No.: WO2015/050497
PCT Pub. Date: Apr. 9, 2015

(65) Prior Publication Data
US 2016/0242229 A1 Aug. 18, 2016

Related U.S. Application Data

(60) Provisional application No. 61/887,037, filed on Oct. 4, 2013.

(51) Int. Cl.
*H04W 76/28* (2018.01)
*H04W 72/04* (2009.01)
*H04W 4/70* (2018.01)

(52) U.S. Cl.
CPC ............ *H04W 76/28* (2018.02); *H04W 4/70* (2018.02); *H04W 72/0406* (2013.01)

(58) Field of Classification Search
None
See application file for complete search history.

(56) References Cited

U.S. PATENT DOCUMENTS 9,084,241 B2 * 7/2015 Madan ............... H04W 76/023
2008/0039110 A1 2/2008 Kim et al.
(Continued)

FOREIGN PATENT DOCUMENTS

EP 2309813 A2 4/2011

OTHER PUBLICATIONS

3GPP, "Analysis and discussion on bandwidth reduction", 3GPP TSG RAN WG1 Meeting #74 R1-132879, Huawei, HiSilicon, Barcelona, Spain, Aug. 19-23, 2013, 1-5.
(Continued)

*Primary Examiner* — Saba Tsegaye
(74) *Attorney, Agent, or Firm* — Sage Patent Group

(57) ABSTRACT

Techniques are disclosed for creating and using a pattern of radio resources to be shared in a cell between devices using an enhanced-coverage mode and at least one other category of devices. An example method includes forming (810) a resource pattern, the resource pattern indicating an allocation of first radio resources in a first cell to a first type of wireless device and indicating an allocation of second radio resources in the first cell to a second type of wireless device. The resource pattern is sent (820) to a second network node of the wireless communication system, e.g., a network node serving a neighboring cell, or to at least one wireless device, or to both. The resource pattern may be used in scheduling by the first network node or the second network node, or both.

30 Claims, 8 Drawing Sheets

(56) References Cited

U.S. PATENT DOCUMENTS

Figure 1:
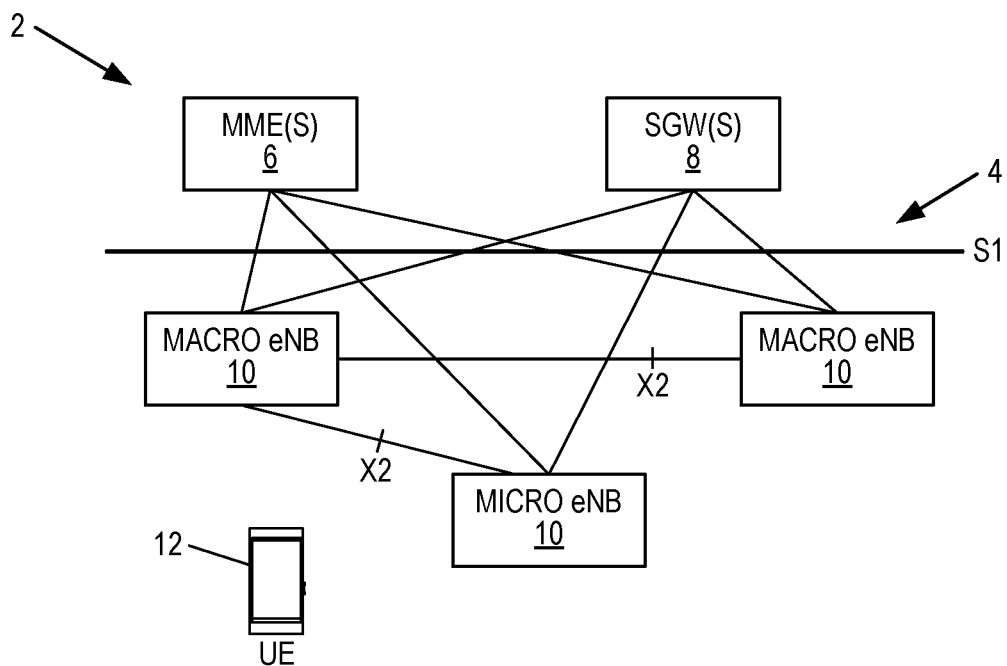

| | | |
|---|---|---|
| 2009/0040928 A1 | 2/2009 | Wang et al. |
| 2010/0144299 A1* | 6/2010 | Ren .................. H04B 1/1615 |
| | | 455/226.1 |
| 2011/0128893 A1* | 6/2011 | Park .................. H04B 7/155 |
| | | 370/279 |
| 2011/0195733 A1 | 8/2011 | Zheng et al. |
| 2012/0044815 A1 | 2/2012 | Geirhofer et al. |
| 2012/0157110 A1 | 6/2012 | Stjernholm et al. |
| 2015/0016312 A1* | 1/2015 | Li .................. H04W 74/0833 |
| | | 370/280 |
| 2015/0078224 A1* | 3/2015 | Xiong .................. H04L 1/1887 |
| | | 370/280 |
| 2015/0146673 A1* | 5/2015 | Geirhofer ............ H04B 7/0626 |
| | | 370/329 |

OTHER PUBLICATIONS

3GPP, "Downlink bandwidth reduction for low cost MTC UE for LTE", 3GPP TSG RAN WG1 Meeting #74 R1-133018, CATT, Barcelona, Spain, Aug. 19-23, 2013, 1-2.

3GPP, "Updated SID on: Provision of low-cost MTC UEs based on LTE", TSG RAN meeting #57 RP-121441, Vodafone, Chicago, USA, Sep. 4-7, 2012, 1-6.

\* cited by examiner

EXCHANGING PATTERNS OF SHARED RESOURCES BETWEEN MACHINE-TYPE AND HUMAN TRAFFIC

TECHNICAL FIELD

The present disclosure is generally related to wireless communications network, and is more particularly related to resource allocation in networks that simultaneously support conventional wireless devices and machine-type-communication (MTC) devices.

BACKGROUND

In a future "Networked Society" scenario there are expected to be a very large number of machine-type-communication (MTC) devices supported by wide-area wireless networks. Many of these devices will transmit a small amount of uplink data (e.g., 100 bits) very infrequently (e.g., once per hour). The 3rd-Generation Partnership Project (3GPP), in its continuing standardization of technology for Long-Term Evolution (LTE), plans to introduce a new solution for "enhanced MTC coverage," with a goal of improving the link budget under enhanced MTC coverage by approximately 15-20 dB, compared to what is supported with the legacy LTE standard. (See, for example, 3GPP Tdoc RP-121441, available at http://www.3gpp.org/ftp/tsg_ran/TSG_RAN/TSGR_57//Docs/.) This is expected to make LTE even more attractive for MTC type of solutions.

Machine-to-machine (M2M) communication, also known as machine-type communication (MTC), is used for establishing communication between machines and between machines and humans. The communication may comprise of exchange of data, signaling, measurement data, configuration information, etc. The device size may vary from that of a wallet to that of a base station. M2M devices are quite often used for applications like sensing environmental conditions (e.g., temperature reading), metering or measurement (e.g., electricity usage, etc.), fault finding or error detection, etc. In these applications, the M2M devices are active very infrequently, but over a particular duration that depends upon the type of service, e.g., about 200 milliseconds once every 2 seconds, about 500 milliseconds every 60 minutes, etc. An M2M device may also perform measurements on frequencies or other RATs other than the frequency or RAT of the cell serving the M2M device.

A M2M communication device can be distinguished from a normal user equipment or "UE," which is 3GPP terminology for a radio access terminal such as a cellular phone, in that the former can communicate with another UE, which can be a M2M device or a normal UE, without human interaction. An M2M device can be identified as such by a network node by the device's capability information, which indicates that it is M2M capable. The capability information is typically signaled by the M2M device to the network node.

The path loss between an M2M device and a base station can be very large in some scenarios, such as when the device is used as a sensor or metering device located in a remote location like the basement of a building. In such scenarios, the reception of the signal transmitted from the base station is very challenging. For example, the path loss can be 20 dB (or more) worse than what is observed by conventional devices in normal situations.

To cope with such challenges, the coverage in uplink and/or in downlink has to be substantially enhanced. This can be realized by employing one or several advanced techniques in the UE and/or in the radio network node for enhancing the coverage. Non-limiting examples of such advanced techniques include transmit power boosting, repetition of transmitted signal, applying additional redundancy to the transmitted signal, use of advanced/enhanced receiver, etc. In general, the M2M can be regarded as operating in "coverage-enhancement mode" or "enhanced-coverage mode" when employing such coverage enhancing techniques. However, in some scenarios, such as when the coverage (e.g., path loss) between M2M device and the radio network node is within normal level, then coverage enhancing techniques are not needed. In this case the M2M device is regarded as operating in "normal-coverage mode." The terms "non-coverage-enhancement mode" and "normal mode" can be interchangeably used with "normal-coverage mode" in the present context.

Depending upon the path loss between M2M device and its serving radio network node, a M2M device and/or radio network node can be configured to operate in "coverage-enhancement mode" or in "normal mode." For example, if the path loss is larger than a particular threshold (e.g., 100 dB), then the coverage-enhancement mode can be employed, while the normal-coverage mode is employed otherwise.

General requirements for many MTC devices, which are often referred to as "sensors," or "sensor devices," include that they be low-cost and consume little energy. One way to achieve reduced cost and energy consumption in these devices is to reduce the bandwidth that the devices are required to support. (Again, see, e.g., 3GPP Tdoc RP-121441.) In the LTE context in particular, it has been suggested that these sensors be designed to support the smallest possible bandwidth supported within 3GPP LTE, which is 1.4 MHz. However, a remaining challenge is how to schedule those devices supporting reduced bandwidth within an LTE system, without affecting the performance of normal 3GPP LTE users.

The concept of mixing machine-type traffic with human-centric traffic (e.g., traffic generated by conventional cellular phones, smartphones, wireless-enabled tablets and computers, etc.) has recently appeared for the first time within 3GPP. This has generated a significant number of new ideas and concepts. Within 3GPP, a number of general proposals regarding this topic have been made. As an example, contributions to the 3GPP RAN 1 working group include such contributions as 3GPP Tdoc R1-132879, "Analysis and discussion on bandwidth reduction", Huawei, HiSilicon, available at http://www.3gpp.org/ftp/tsg_ran/wg1_rl1/TSGR1_74/Docs/, and 3GPP Tdoc R1-133018, "Downlink bandwidth reduction for low cost MTC UEs for LTE", CATT, available at http://www.3gpp.mobi/ftp/tsg_Ran/WG1_RL1/TSGR1_74/Docs/.

In these contributions, high-level trade-offs are described for the use of spectrum bands to be used for M2M within the LTE spectrum. Proposals for either dedicated spectrum allocation, or dynamic, or semi-static allocation for M2M have been made. However, no mechanism is provided for indicating which resources of the system are going to be allocated to M2M. Moreover, no other structure, physical or logical mechanism within 3GPP specifications exists in which different type of traffic is mixed with the normal traffic to be supported by LTE.

SUMMARY

The techniques, apparatus, and systems disclosed herein include several embodiments. Several embodiments relate to a method, in a network node, of creating a pattern of radio resources to be shared in a cell between M2M UEs in enhanced-coverage mode and at least one other category of devices, such as "normal" or "legacy" UEs supporting human-centric data traffic and/or M2M UEs operating in a normal-coverage mode, where the pattern is determined based on radio quality and/or traffic distribution of different kinds of UEs. In some of these embodiments, information about the created pattern is signaled to other network nodes and/or to UEs, which use the pattern for interference coordination, interference mitigation, scheduling or radio operation tasks such as measurement adaptation or receiver adaptation, etc.

Other embodiments relate to methods, in a network node, for scheduling of radio resources to its UEs in a cell by taking into account at least its own pattern of radio resources and optionally one or more patterns of radio resources allocated in neighboring cells for sharing resources between M2M UEs and normal UEs associated with human traffic. In some of these embodiments, the scheduling of radio resources is performed so as to reduce or minimize inter-cell interference.

More specifically, one example method, implemented in a network node of a wireless communication system, includes forming a first resource pattern, the first resource pattern indicating an allocation of first radio resources in a first cell, in the time domain, to a first type of wireless device and indicating an allocation of second radio resources in the first cell, in the time domain, to a second type of wireless device. The example method further includes sending the first resource pattern to a second network node of the wireless communication system, or to least one wireless device, or to both. In some embodiments, as discussed in further detail below, the first type of wireless device consists of wireless devices that are capable of operating in an enhanced-coverage mode, while the second type of wireless device comprises wireless devices that do not support the enhanced-coverage mode. The wireless devices that are capable of operating in an enhanced-coverage mode may be machine-to-machine (M2M) wireless devices.

In some embodiments, the first resource pattern is used by the network node for scheduling uplink and/or downlink transmissions in the first cell for at least one wireless device of each type. In some of these embodiments, the network node receives a second resource pattern from a second network node of the wireless communication system, the second resource pattern indicating allocations, by the second network node, of radio resources in a second cell, in the time domain, to the first and second types of wireless device. In these embodiments, the scheduling of uplink and/or downlink resources may be at least partly based on the received second resource pattern.

In other embodiments, a similar second resource pattern is received from a second network node of the wireless communication system, with the second resource pattern similarly indicating allocations, by the second network node, of radio resources in a second cell, in the time domain, to the first and second types of wireless device. In these embodiments, however, the received second resource pattern, which may identify resource allocations in a closely neighboring cell, for example, is used to form the first resource pattern. This approach may be taken to reduce interference, for example.

Other factors may be used to form the first resource pattern, in various embodiments. For example, forming the first resource pattern may be at least partly based on an evaluation of traffic distribution among the first and second types of wireless device. Forming the first resource pattern may comprise allocating radio resources to the first type of wireless device according to the proportion of wireless devices of the first type among the wireless devices of the first and second types, in some embodiments. Further, forming the first resource pattern may be at least partly based on an evaluation of expected signal quality for one or more of the radio resources. For example, in some embodiments where the first type of wireless device consists of wireless devices that are capable of supporting an enhanced-coverage mode and the second type of wireless device includes wireless devices that do not support the enhanced-coverage mode, forming the first resource pattern may comprise allocating radio resources expected to have the lowest signal quality for one or more of the wireless devices to the first type of wireless device, i.e., to the devices that support the enhanced-coverage mode and are thus best able to handle the lower signal quality.

Another example method according to some of the inventive techniques disclosed herein, also implemented in a network node, begins with receiving, from another network node, a resource pattern indicating an allocation by the other network node of radio resources in a first cell to first and second types of UEs. The method continues with using the received resource pattern for scheduling uplink and/or downlink transmissions for at least one wireless device of each type, based at least in part on the received resource pattern. Once again, the first type of wireless device may consist of wireless devices that are capable of operating in an enhanced-coverage mode, while the second type of wireless device includes wireless devices that do not support the enhanced-coverage mode.

In some embodiments operating according to this second example method, the network node forms a second resource pattern, the second resource pattern indicating allocations, by the network node, of radio resources in a second cell, in the time domain, to the first and second types of wireless device. In these embodiments, the forming of the second resource pattern is based at least partly on the received first resource pattern. In some of these embodiments, forming the second resource pattern is further based at least partly on an evaluation of traffic distribution among the first and second types of wireless device and/or is further based at least partly on an evaluation of expected signal quality for one or more of the resources.

Still another example method is suitable for being carried out in a wireless device, such as an LTE UE. This example method includes receiving a first resource pattern from a network node, the first resource pattern indicating an allocation in a cell by the network node of first radio resources in the time domain to the first type of wireless device and indicating an allocation in the cell of second radio resources in the time domain to the second type of wireless device, and continues with performing one or more radio operations based on the first resource pattern and based on the type of the wireless device. In some embodiments, performing one or more radio operations based on the first resource pattern and based on the type of the wireless device comprises adjusting a discontinuous receive (DRX) cycle or discontinuous transmit (DTX) cycle, or both. In some of these and in some other embodiments, performing one or more radio operations based on the first resource pattern and based on the type of the wireless device may include one or more of: interference handling or mitigation; performing a measurement; an adaptation of receiver type; and transmitting information about the received first resource pattern to another wireless device.

In some embodiments, a wireless device carrying out the example method described above signals a capability indicator to the network node, the capability indicator indicating that the wireless device is capable of handling a resource pattern that indicates an allocation in a cell by the network node of first set of radio resources in the time domain to the first type of wireless device and that indicates an allocation in the cell of second set of radio resources in the time domain to the second type of wireless device.

Additional methods as well as corresponding apparatus and systems are detailed below.

DETAILED DESCRIPTION

FIG. 1 shows an example diagram of an EUTRAN architecture, as part of an LTE-based communications system 2. Nodes in the core network 4 include one or more Mobility Management Entities (MMEs) 6, a key control node for the LTE access network, and one or more Serving Gateways (SGWs) 8, which route and forward user data packets while acting as a mobility anchor. They communicate with base stations 10, referred to in LTE as eNBs, over an interface, for example an S1 interface. The eNBs 10 can include the same or different categories of eNBs, e.g. macro eNBs, and/or micro/pico/femto eNBs. The eNBs 10 communicate over an interface, for example an X2 interface. The S1 interface and X2 interface are defined in the LTE standards. A UE 12 can receive downlink data from and send uplink data to one of the base stations 10, with that base station 10 being referred to as the serving base station of the UE 12. It should be appreciated that while the techniques described herein may be applied in the context of an EUTRAN network, e.g., as illustrated in FIG. 1, the techniques may also be applied in other network contexts, including in UTRA networks.

Note that in some of the embodiments described herein, the terms "user equipment" and "UE" are used. A UE, as that term is used herein, can be any type of wireless device capable of communicating with a network node or another UE over radio signals. A UE may also be referred to as a wireless device, a radio communication device, or a target device, and the term is intended to include device-to-device UEs, machine-type UEs or UEs capable of machine-to-machine communication, sensors equipped with a UE, wireless-enabled table computers, mobile terminals, smart phones, laptop-embedded equipped (LEE), laptop-mounted equipment (LME), USB dongles, wireless customer-premises equipment (CPE), etc. In the discussion that follows, the terms M2M device, MTC device, wireless sensor, and sensor are used interchangeably. It should be understood that these devices are UEs, but are generally configured to transmit and/or receive data without direct human interaction.

It should also be noted that several of the techniques described herein may depend in some way on a distinction between M2M devices and non-M2M devices, the latter of which may sometimes be referred to as "normal" UEs. It will be appreciated that these techniques may also be applied in a manner that distinguishes between M2M devices that are capable of operating in an enhanced-coverage mode and other devices. In this case, the "other devices" may include M2M devices that are not capable of operating in an enhanced-coverage mode and/or M2M devices that are not presently configured for operation in an enhanced-coverage mode. Thus, for example, if a technique detailed below describes an evaluation of separate traffic loads for M2M devices and "normal" UEs, it should be understood that the same technique may be applied in such a way that separate traffic loads are evaluated for M2M devices capable of operating in an enhanced-coverage mode and for all other UEs, for example. Moreover, the same technique may be applied to more than three categories of devices, e.g., to M2M devices that are capable of operating in enhanced-coverage mode, other M2M devices, and non-M2M devices.

Figure 2:
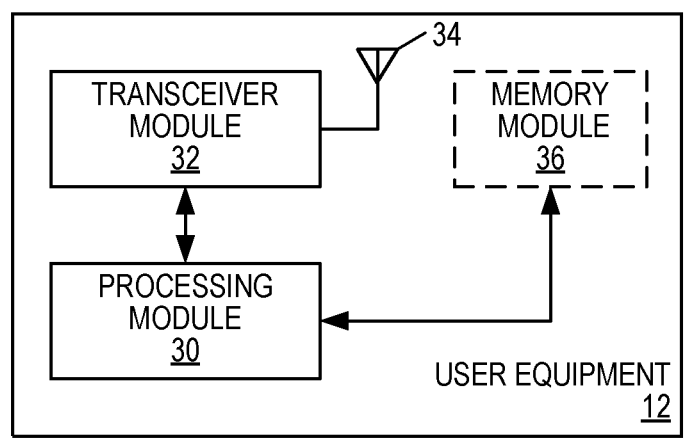

FIG. 2 shows a user equipment (UE) 12 that can be used in one or more of the example embodiments described herein. The UE 12 may in some embodiments be a mobile device that is configured for machine-to-machine (M2M) or machine-type communication (MTC). The UE 12 comprises a processing module 30 that controls the operation of the UE 12. The processing module 30, which may comprise one or more microprocessors, microcontrollers, digital signal processors, specialized digital logic, etc., is connected to a receiver or transceiver module 32 with associated antenna(s) 34 which are used to receive signals from or both transmit signals to and receive signals from a base station 10 in the network 2. To make use of discontinuous reception (DRX), the processing module 30 can be configured to deactivate all or parts of the receiver in transceiver module 32 for specified lengths of time. The user equipment 12 also comprises a memory circuit 36 that is connected to the processing module 30 and that stores program and other information and data required for the operation of the UE 12. Together, the processing module and memory circuit may be referred to as a "processing circuit," and are adapted, in various embodiments, to carry out one or more of the UE-based techniques described below.

Also, in the description of some embodiments below, the generic terminology "radio network node" or simply "network node" or "NW node" is used. These terms refer to any kind of network node in the fixed portion of the wireless communication network, such as a base station, a radio base station, a base transceiver station, a base station controller, a network controller, an evolved Node B (eNB), a Node B, a relay node, a positioning node, a E-SMLC, a location server, a repeater, an access point, a radio access point, a Remote Radio Unit (RRU) Remote Radio Head (RRH), a multi-standard radio (MSR) radio node such as MSR base station nodes in distributed antenna system (DAS), a SON node, an O&M, OSS, or MDT node, a core network node, an MME, etc. As can be seen from these example, the term "fixed portion" of the wireless communication network is meant to refer to the portion of the wireless network other than the access terminals, i.e., the portion of the network that is accessed through a radio link by UEs, M2M devices, and the like, and is not meant to preclude the possibility that one or more elements in a given scenario can be moved. Referring once again to FIG. 1, for example, it will be appreciated that all of the illustrated elements other than UE 12 are examples of "network nodes" as that term is used herein, with the eNBs 10, which are equipped with radio transceivers for communication with one or more UEs 12, being examples of the narrower term "radio network node."

Figure 3:
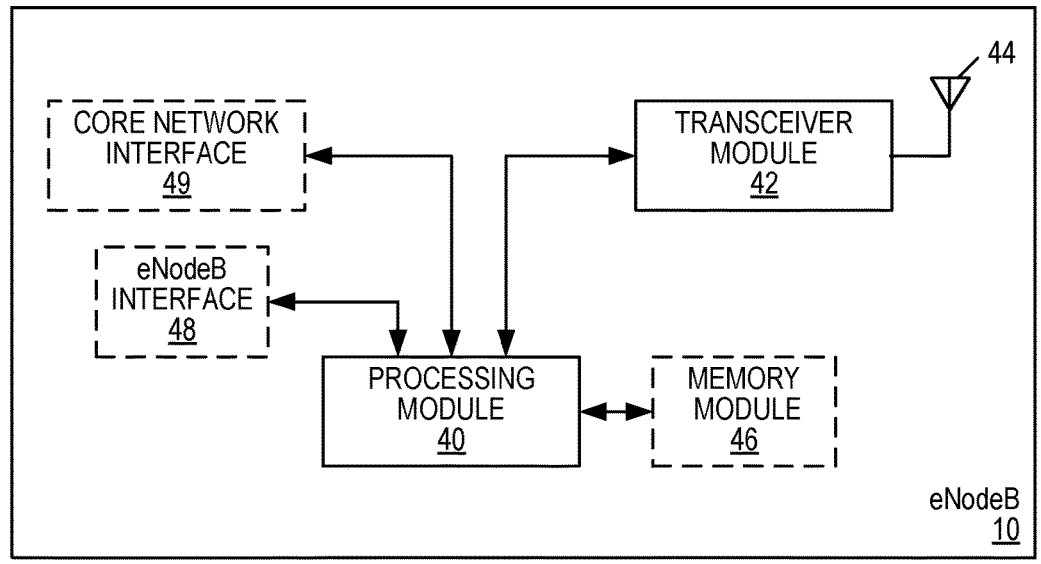

FIG. 3 shows a base station 10 (for example a NodeB or an eNodeB) that can be used in some of the example embodiments described herein. It will be appreciated that although a macro eNB will not, in practice, be identical in size and structure to a micro eNB, for the purposes of illustration, the base stations 10 are assumed to include similar components. Thus, whether or not base station 10 corresponds to a macro base station or a micro base station, it comprises a processing module 40 that controls the operation of the base station 10. The processing module 40, which may include one or more microprocessors, microcontrollers, digital signal processors, specialized digital logic, etc., is connected to a transceiver module 42 with associated antenna(s) 44 that are used to transmit signals to, and receive signals from, UEs 12 in the network 2. The base station 10 also comprises a memory circuit 46 that is connected to the processing module 40 and that stores program and other information and data required for the operation of the base station 10. Together, the processing module 40 and memory circuit 46 may be referred to as a "processing circuit," and are adapted, in various embodiments, to carry out one or more of the network-based techniques described below.

Base station 10 also includes components and/or circuitry 48 for allowing the base station 10 to exchange information with other base stations 10 (for example, via an X2 interface) and components and/or circuitry 49 for allowing the base station 10 to exchange information with nodes in the core network 4 (for example, via the S1 interface). It will be appreciated that base stations for use in other types of network (e.g., UTRAN or WCDMA RAN) will include similar components to those shown in FIG. 3 and appropriate interface circuitry 48, 49 for enabling communications with the other network nodes in those types of networks (e.g., other base stations, mobility management nodes and/or nodes in the core network).

Figure 4:
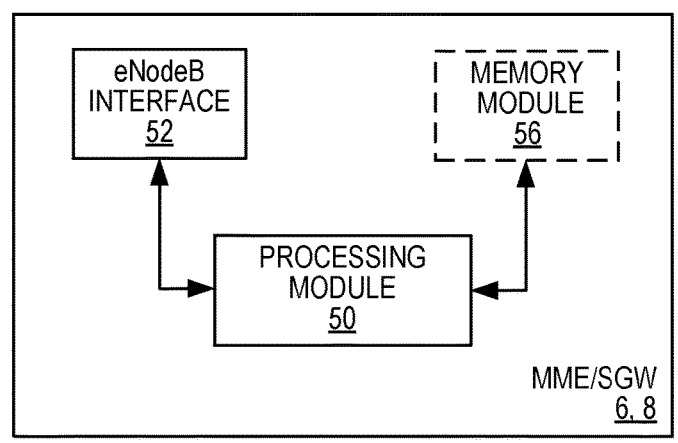

FIG. 4 shows a core network node 6, 8 that can be used in the example embodiments described. The node 6, 8 comprises a processing module 50 that controls the operation of the node 6, 8. The processing module 50, which may include one or more microprocessors, microcontrollers, digital signal processors, specialized digital logic, etc., is connected to components and/or circuitry 52 for allowing the node 6, 8 to exchange information with the base stations 10 with which it is associated (typically via the S1 interface). The node 6, 8 also comprises a memory circuit 56 that is connected to the processing module 50 and that stores program and other information and data required for the operation of the node 6, 8. Together, the processing module 50 and memory circuit 56 may be referred to as a "processing circuit," and are adapted, in various embodiments, to carry out one or more of the network-based techniques described below.

It will be appreciated FIGS. 2, 3, and 4 illustrate only those components of the UE 12, base station 10, and core network node 4, 6 that are needed to explain the embodiments presented herein, and will, in practical implementations include many other elements that are well understood by those familiar with the design and implementation of such devices.

As noted above, challenges for supporting M2M/MTC devices include how to schedule those devices that support reduced bandwidth and/or enhanced coverage techniques within an LTE system, without affecting the performance of normal 3GPP LTE users. In order to meet M2M requirements and to enable M2M traffic coexistence with human-centric traffic within the same radio spectrum, there is a need to address efficient resource sharing between M2M and human traffic and specify the operational framework of such scheme(s). In this respect, 3GPP has mainly discussed three possible schemes.

A first option is to allocate a fixed part of the LTE bandwidth for M2M. With this approach, sensors would be aware of the existence of such part of dedicated spectrum through either dedicated signalling or via information broadcasted by the network. All M2M type traffic is then served within this part of the LTE spectrum. Note that the fixed allocation of resources can include contiguous resources or resources that are dispersed within the LTE spectrum. A second option is that the resources for M2M are allocated in a semi-static manner. This option provides some flexibility for resource allocation to M2M. The nature of resources to be scheduled to users is similar to the case of fixed allocation. A third option is that resources for M2M are allocated in a dynamic manner. Within each Transmission Time Interval (TTI), the resources to be allocated to M2M are decided. More details on these three different options can be found in 3GPP documents R1-132879, "Analysis and discussion on bandwidth reduction", Huawei, HiSilicon, and R1-133018, both of which were referenced above.

A major problem with all three of these general solutions is that there is no proposal for defining the resources to be used by M2M, namely which part of the LTE bandwidth, or which resource blocks, are to be granted for M2M connections. There is also a particular problem with the static/fixed allocation of resources to M2M: this approach provides no scheduling flexibility, which means that some system capacity might be lost.

The techniques and apparatus described herein address these problems. Embodiments of the disclosed techniques include, but are not necessarily limited to, the following:

- a network node configured to determine a pattern of radio resources for coverage enhancement;
- a method, implemented in a network node, for exchanging a pattern of radio resources for coverage enhancement;
- network nodes configured to signal a pattern of radio resources for coverage enhancement to UE;
- a network node configured to use a pattern of radio resources for scheduling, to enhance coverage;
- a method of signaling capabilities associated with a pattern of radio resources for coverage enhancement
- a method, implemented in a network node, of determining a pattern of radio resources for machine-to-machine (M2M) communications traffic of lower priority, compared to human centric traffic;
- a method, implemented in a network node, of determining a pattern of radio resources for traffic of lower priority, compared to human centric traffic;
- a method, implemented in a network node, of determining a pattern of radio resources for M2M communications originating from machines operating within a limited bandwidth, compared to the system bandwidth; and
- a UE (of sensor type) adapted to receive a pattern and adjust its DRX/DTX cycles accordingly.

Other embodiments, as discussed in further detail below, include combinations of two or more of the features summarized above.

Figure 5:
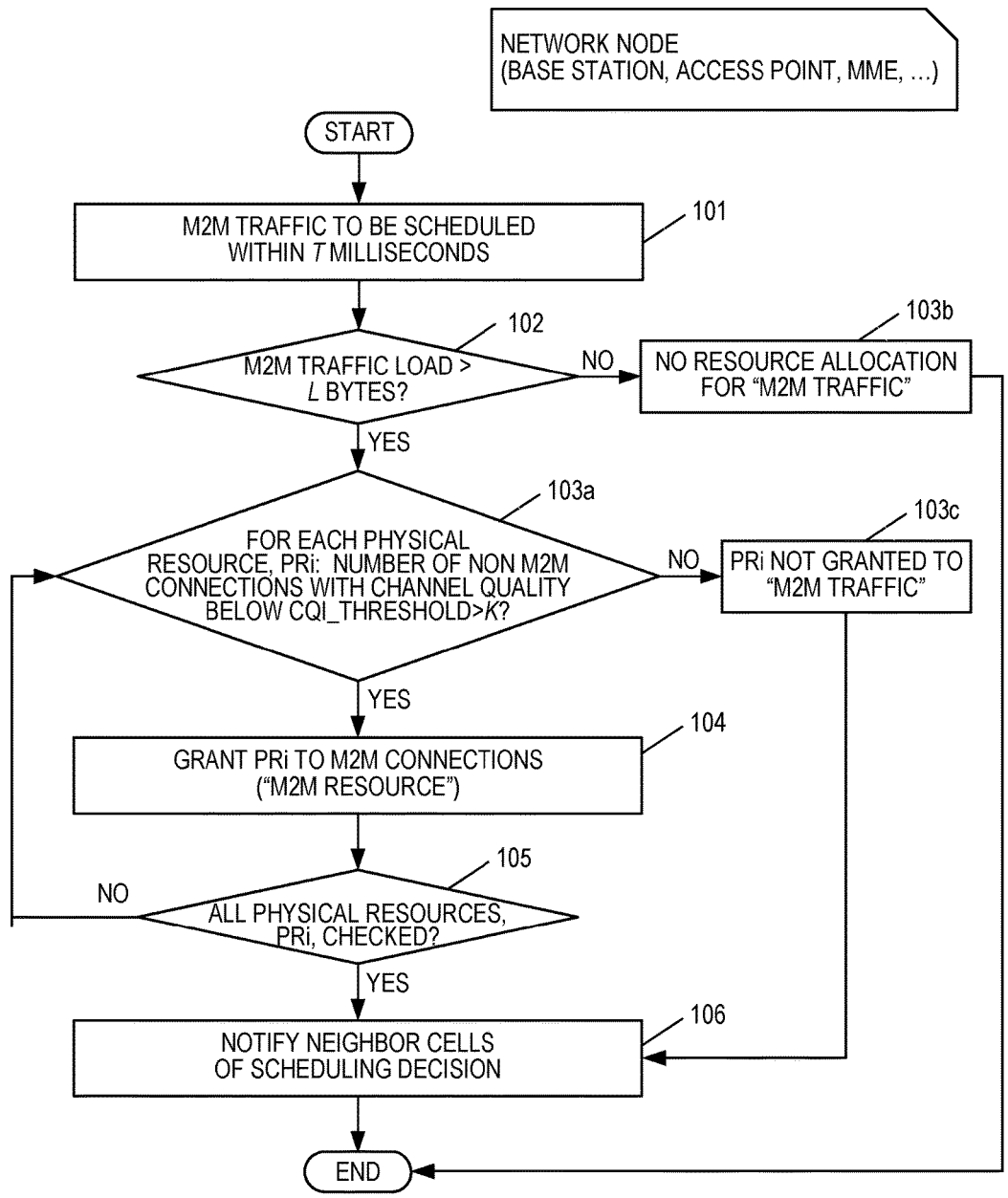

FIG. 5 is a process flow diagram that illustrates an example method, in a network node, for determining a pattern of radio resources that indicates allocations of radio resources among first and second types of wireless devices, in this case between devices that are capable of operating in an enhanced-coverage mode and those that are not. The illustrated method, and variants thereof, can be applied to downlink scheduling, uplink scheduling, or both. The illustrated method can be executed in a base station, eNode B, relay node, radio network controller, base station controller, access point, or any other wireless access point to the network.

As shown at block 101, the illustrated method begins with a determination that M2M traffic, in this case to M2M devices capable of supporting an enhanced-coverage mode, is to be scheduled within a particular window, in this case within T milliseconds. The period of T milliseconds might correspond to the time between consecutive resource allocations for M2M. The network node may determine this from conventional buffer data reporting from normal terminals and sensors. In addition, it might be that sensors transmit in uplink or receive in downlink according to a predefined pattern and only when sensors wake up from their long sleeping mode; this pattern may be known at the network node and factored into the determination of whether M2M is to be scheduled within the window.

As shown at block 102, the network node determines whether the M2M traffic to be scheduled exceeds a predetermined threshold, e.g., a threshold of L bytes. If the M2M traffic to be scheduled does not exceed this threshold then there is no resource allocation for the M2M allocation in the current window, as shown at block 103b. This is appropriate, given the assumption that the M2M traffic is not particularly sensitive to delivery latency. It is noted here that for the downlink, knowledge of the amount of data to be transmitted is available at the base station. For uplink, this knowledge can be available if sensors make scheduling requests by using the current 3GPP LTE procedure according to which sensors report their buffer status or occupancy. In addition, several proposals have been done in 3GPP and in SG discussion fora, such as the EU-funded project METIS, which proposals describe that some sensors transmit according to a well-defined pattern that is known at the network. In this case, the network is well aware of the amount of traffic waiting for uplink transmission in the next T milliseconds.

In the event that the amount of M2M traffic is higher than this threshold, then the system allocates a number of physical resources to machine type traffic. More particularly, if there is sufficient M2M traffic to be scheduled, then the process proceeds to evaluating specific physical resources (e.g., a resource block), with respect to the non-M2M connections that need to be serviced. This is done by identifying those resources in which the channel quality of normal mobile terminals is the worst, for example. The rationale behind this particular scheduling policy is that sensors typically transmit or receive small packets. It is also very likely that they are going to support only the lowest data rate modulation schemes, e.g., BPSK, QPSK, so that error vector magnitude (EVM) requirements may be relaxed, at least in the uplink. Thus, sensors will not typically achieve very high data rates on channels with high quality. Consequently, this policy is based on an assumption that sensors should try to schedule UEs over resources that are within a certain rate-maximizing region for the available modulation schemes. Such restrictions on modulation schemes may also be useful on the downlink if the dynamic range requirements of analog-to-digital converters on machine devices are relaxed with respect to normal or legacy UEs.

Block 103a of FIG. 5 illustrates the evaluation of whether, for a given resource PRi, there are more than K non-M2M connections that have a channel quality below a certain quality threshold, CQI_Threshold. In other words, the network node evaluates each resource to determine whether it would generally provide poor quality to those wireless devices that do not support an enhanced-coverage mode. If the answer is yes, then the resource is granted to an M2M connection, as shown at block 104. Otherwise, the resource PRi is not allocated to M2M traffic, as shown at block 103c. Note that this implies that the partitioning of resources to be scheduled to human traffic and M2M traffic has to be done prior to allocating resources to terminals human traffic according to any policy. Note that this is only one example of a criterion for partitioning resources. Other factors, such as total load, traffic demand, quality of service for normal uses, etc., may also be considered.

As shown at block 105, the network node then determines whether all physical resources have been checked—if not, the evaluation of resources continues, as shown at block 103. Once all physical resources have been evaluated, one or more neighbor cells are notified of the network node's scheduling decision, as shown at block 106, after which the process ends, at least until it is repeated for another scheduling window.

Several parameters illustrated in FIG. 5 may vary from one embodiment or instance to another. Regarding the time window of T milliseconds, the time T depends on how dynamic the resource allocation to M2M traffic should be. Values of T can range from 1 millisecond, for example, if M2M type traffic is scheduled every transmission time interval (TTI), or up several dozens of milliseconds. Expected typical values are in the order of 1 to 10 or 20, or in the order of 100 milliseconds, due to the most common traffic activity pattern for sensors up to now. Another sensible option would be to set a value T at the same order of the DRX cycle of sensors. Typical values may also depend on whether the machine is involved in sensing or control. A sensor can be delay tolerant for periodic data transfer, but may not be delay tolerant for alarm events. An actuator can be delay tolerant for scheduled events, but may not be so for active industrial control where bounded delay is more important. Delays of the order of 10 milliseconds are the best that can be achieved with LTE for random events, but persistent traffic can create a virtual circuit. However, the techniques described here are mainly targeting sensors that carry non-delay-critical traffic.

Regarding the M2M traffic type load L that must exist before the allocation procedure shown in FIG. 5 is triggered, its setting depends on the scheduler policy. Values of L can vary from 0, meaning that as long there is one bit of M2M type of traffic, resources are granted to it, up to several thousands of bytes, if the scheduler policy is to schedule, as much as possible the allocation of resources to sensors. Alternatively, the value of L can be modified upon consideration of the load of normal terminals. The higher the load from normal terminals is, then, the higher the value of L becomes and vice-versa. A typical value of N could be on the order of 1000 bytes, but pending transmissions would also be expedited by a timer that ensures that data traffic is not locked into a buffer indefinitely Similarly, the value of CQI_Threshold depends on the scheduler policy and on the capability of the sensors. For example, in the event that the sensors can cope with QPSK modulation, for example and the required SINR for QPSK is, e.g., 0 dB, then the value of CQI_Threshold can be 0 dB or something close to it. This value depends also on the policy of the scheduler with regards to the impact on system performance as a whole. For example, in the event that the impact on system performance must be minimized, then the value of this CQI_Threshold should be set as low as possible. If higher flexibility in mixing M2M traffic with human centric traffic is desired, then the value of this CQI_Threshold can be higher, e.g. 10 dB or higher. As with the value of L, the setting of CQI_Threshold may be affected by the load of normal terminals traffic. The higher the traffic/load from other terminals is, the lower should the value of CQI_Threshold be, and vice-versa. In general, the lower the signal-to-interference-plus-noise ratio (SINR) for a given terminal's radio link, the longer it takes to empty a terminal's buffers. Moreover, the choice of threshold may limit the time that it takes to gain access to the channel.

Regarding the setting of the value K, a similar rationale as for the value of CQI_Threshold is followed. The setting of this value also depends on the scheduler policy and on the desired impact to system performance. In case the policy is to have the minimum impact onto system performance, then the value of K should be equal to the total number of active normal users. Hence, only if all active normal terminals have channel quality below the threshold for a given channel, then this channel is granted to sensors. On the opposite side, K can be set to 0, if there is no specific concern with regards to overall system performance due to the transmissions of sensors. The setting of K may also depend on the offered load of normal terminals. The higher the load of normal terminals is, the higher the value of K should be. The maximum value K can get is the total number of active normal users at the instant the algorithm is executed.

It can be deduced from the above, that if the wish is to minimize the impact from M2M traffic on overall system performance, then probably no resource is granted to M2M traffic at a given time instant. In contrast, if the thresholds are set so that resources are very easily granted to M2M traffic, then the impact on overall system performance is significant. Hence, the illustrated technique, which can be tuned to yield different tradeoffs at different times, is an efficient traffic-balancing tool between M2M type of traffic and human-centric traffic.

Once the physical resources to be granted to M2M traffic are decided, then the scheduling of physical resources among sensors can be done according to any scheduling policy decided by the network. Round-robin or best-channel-allocation scheduling schemes are examples of scheduling schemes that are sensible for M2M traffic of no urgency. Alternatively, the scheduling decisions for M2M devices may be based on whether the sensor is in need of coverage enhancement or not. The network can be aware of the state of a sensor, based on explicit signaling, or random access channel (RACH) preamble usage by the sensor, or SINR reporting by the sensor, or via other similar methods.

Figure 7:
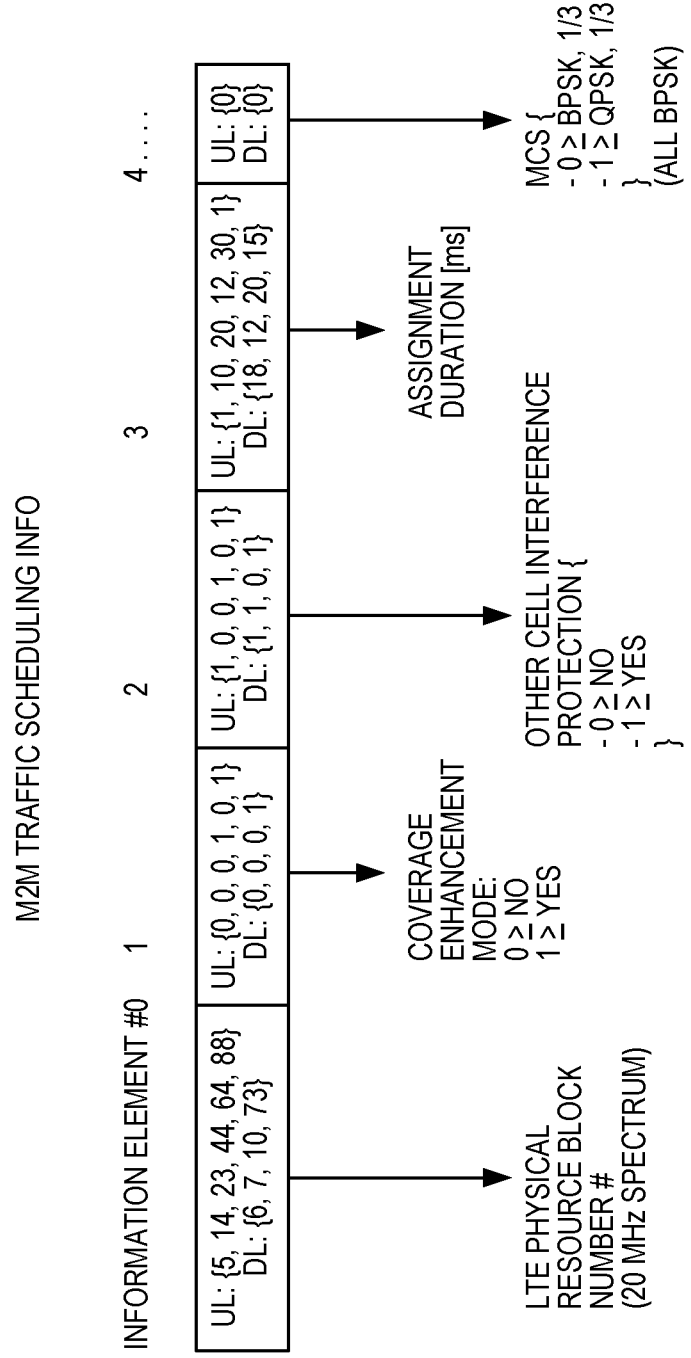

The network node may also inform other network nodes of the exact resources that have been used for different types of UEs over the past certain time. In this way, the receiving network node will be able to determine the match between the pattern and the actual usage of resources in certain neighboring node. This information may be used for load balancing by avoiding the use of PRBs that are more likely to have high interference levels. For example, assume that network node m receives indications that N network nodes in its neighbor cell list have assigned a certain PRB mk for M2M traffic. Some fraction of these N network nodes can altruistically decide not to use PRB mk in the downlink assignment. This will have the effect of lowering other cell interference, especially where M2M UEs may be numerous and occupy a small number of PRBs, and thus raising power spectral density locally in frequency. Once the decision is made internally in the scheduler, the results of the decision are notified to neighbor cells, via X2 or S1 or via any other proprietary interface. This notification can contain the number of physical resource element granted in uplink or downlink, the sensor being in need of coverage-enhancement mode or not, the need to protect the sensor transmission from other cell interference, the duration the resource allocation is valid and the MCS applied. An example of such a message is shown in FIG. 7, which is discussed in a little more detail below. This particular example message is suitable for an LTE system consisted of 100 PRBs. The neighbor cells can make use of this information for doing scheduling.

It will be appreciated that a general objective of the particular method shown in FIG. 5 is to determine at least two sets of radio resources, where a first set of resources is to be used to serve M2M devices operating in enhanced-coverage mode, and a second set of resources is to be used to serve M2M devices in normal mode and/or "normal" UEs (i.e., UEs other than M2M devices) operating in normal or legacy mode.

Note that the determined set of resources can be expressed in terms of one or more patterns of resources, wherein any given pattern may be periodic or aperiodic. The pattern may further be expressed in terms of a sequence such as bit map (e.g., ABABBBAB) where, for example the A and B represent radio resources for use for enhanced-coverage mode and normal or legacy modes respectively.

Leaving aside the specific method illustrated in FIG. 5, it will be appreciated that the network node can use one or several criteria/information elements to determine the pattern of resources. Generally, the network node uses at least radio measurement results from UEs and/or from one or more network nodes to determine the pattern. The network node may further take into account the pattern of resources used in one or more neighboring network nodes when deriving its own pattern of resources. The network node may even take into account network traffic loads with respect to different types of devices, i.e., the load with respect to M2M devices requiring enhanced-coverage mode of operation and/or the load respect to M2M devices requiring normal mode of operation and the normal UEs.

Another example of a method of determining the resource pattern in a network node can be described as follows. In this example, the network node collects UE radio measurements, such as channel state information (CSI), from one or more UEs. CSI may include at least one of Channel Quality Information (CQI), rank indicator (RI) and precoding matrix indicator (PMI). The UE radio measurements may also include signal quality measurements, some of which are defined by wireless standards, such as Received Signal Reference Power (RSRP) and/or Received Signal Reference Quality (RSRQ). In addition, the network may also collect information about the traffic situation for one or more terminals and/or machine-type devices (e.g., data in their buffers, buffer size, file or packet size, etc.) in order to perform scheduling.

Based on multiple measurements from one or several UEs, the network node may determine an overall quality or interference on each of several different set of radio resources, e.g., resource blocks (RBs), subframes, time slot, etc. If the overall signal quality is below a threshold or if it significantly varies between different resources, then the network node may decide to create a pattern for the purpose of assigning different resources to different types of UEs in a pattern of resources. For instance, the network node may allocate resources with low signal quality to M2M UEs (e.g., to M2M UEs capable of operating in enhanced-coverage mode), while allocating resources with better signal quality to normal UEs. More details of example resource assignment and/or scheduling policies are described below.

The network node may also, before determining the pattern for resource allocation, assess the need for creating a pattern at all, e.g., based on determining whether there are both M2M UEs and normal UEs operating in a cell. The network node may configure the resources for M2M UEs and normal UEs in a pattern according to the proportion of M2M UEs and normal UEs and may further consider their traffic requirements/demands. For example, if 20% of the total UEs in a cell are M2M devices, then two out of ten subframes in a radio frame are recommended to be used for M2M transmission, while the remaining eight are used for normal UEs. The network node may further use signal quality measurement results to decide which of the two subframes are to be used for M2M UEs and which ones for normal UEs. As one simple example, this can be done at the beginning of each subframe. In case the average channel quality reported at the current subframe is below a threshold, Threshold_Quality, then the coming subframe is allocated to M2M transmission. In this way, the subframes following subframes with lower signal quality can be assigned for use for M2M UEs.

A "pattern" of resources, as the term is used herein, refers to a specific sequence of information indicating a selective allocation of radio resources among two (or more) types of wireless devices. In several embodiments of the presently disclosed techniques, the network node creates and sends this pattern of resources, or "resource pattern," to other nodes. More specifically, a resource pattern may include a pattern of sequence, e.g., pattern $(k)=[a_1(n), a_2(n+1), \ldots a_m(n+k)]$, where $a_m$ is set of resources for UE type 'm' and 'k' is a specific length of pattern over which the resource pattern is valid. if necessary, the resource pattern sent to other nodes may also include additional information to facilitate determination and interpretation of the pattern.

Consider, for example, a pattern of resources for two types of UEs, e.g., M2M UEs and normal UEs, where every fourth subframe is used for M2M UEs and where the pattern repeats after every second frame (i.e., every 20 subframes). In this example, further assume that "0" and "1" denote resources for normal and M2M UEs, respectively. This example pattern, can be represented as follows:

[0 0 0 1 0 0 0 1 0 0 0 1 0 0 0 1 0 0 0 1].

Consider another example resource pattern for three types of UEs, e.g., M2M UEs requiring enhanced-coverage mode of operation, M2M UEs requiring normal-coverage mode of operation, and normal/legacy UEs. In this example, every fifth subframe is for M2M UEs, with the pattern repeating after every two frames (i.e., every 20 subframes). However, the fifth subframe alternates between M2M UEs requiring enhanced-coverage mode and normal mode. This means, effectively, that the enhanced-coverage mode is used only in one out of ten subframes. In this example, further assume that "0," "1," and "2" denote resources for normal UEs, M2M UEs not requiring enhanced-coverage mode, and M2M UEs requiring enhanced-coverage mode, respectively. Such a pattern is represented as follows:

[0 0 0 0 1 0 0 0 0 2 0 0 0 0 1 0 0 0 0 2].

In some embodiments, a network node may know that all or some M2M traffic has no strict latency requirement. Such information can be provided to the network with existing RRC (Radio Resource Control) signaling, for example. In such a case, the allocations described herein may apply only for M2M traffic type of no urgency, rather than to all M2M devices.

The resource pattern and, optionally, any associated information, may be predetermined and/or configured at the neighboring network node and/or at the UE by the network node. Examples of additional information that may be associated with the resource pattern include: a sequence length, e.g., the number of elements in a sequence, a duration over which the pattern is sent, etc.; and a reference time, e.g., from where pattern starting time is derived. Examples of reference time include: a frame number such as SFN, e.g., SFN=0; absolute time, e.g., based on a global clock such as GPS; after M time instances (e.g., M frames) upon an event triggering the transmission of pattern (see below on triggering event).

Other associated information may include, for example, a pattern start time, i.e., at what time the pattern starts. This can be derived from a reference time, e.g., K frames after SFN=0. Likewise, associated information may include a pattern end time, i.e., at what time the pattern stops. The pattern end may be derived from a reference time, for example, such as N frames after SFN=0, as well as from the start time and sequence length. Still other associated information may include: a direction of applicability, e.g., whether it applies to uplink operation, downlink operation or both; a type of transmission or downlink and/or uplink channels for which the pattern is applicable or for any type of transmission, e.g., PDSCH, PUSCH, PDCCH, PUCCH, etc.; a pattern repetition characteristic; e.g., whether it is periodic, aperiodic, one time transmission (i.e., pattern sent only once), etc.; an indication whether the pattern provides information about resource distribution between different types of UEs in time domain (e.g., subframes), in frequency domain (e.g., set of RBs in all subframes) or in time-frequency domain (e.g., set of RBs over certain subframes); frequency information, e.g., carrier frequency (such as EARFCN) or frequency band for which the pattern is applicable; an indicator indicating whether the pattern is the same for serving carrier and one or more non-serving carrier frequencies, respectively. Note that at least this last item may be UE-specific, since other UEs may be configured with different serving and non-serving carriers. As a result, embodiments using this indicator may be based on dedicated signaling.

Still other examples of associated information include a pattern-triggering condition, i.e., condition(s) under which the network node initiates transmission of the pattern to the other network node and/or to the UE. Example triggering conditions for sending a pattern include: upon change in traffic distribution between M2M and normal UEs; and upon change in radio conditions in a cell. Likewise, associated information may specify a pattern-terminating condition, i.e., conditions under which the network node stops the ongoing transmission of the pattern, such as when there are no active M2M users, or when interference or cell load is below a threshold.

Figure 6:
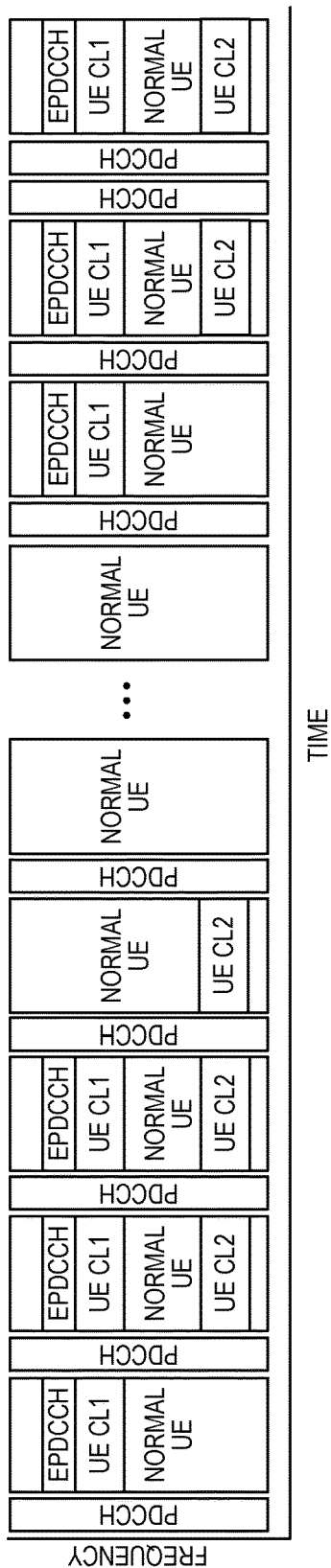

As shown in FIG. 6, a pattern may also be defined to be confined in the frequency domain, e.g., with a particular number of subframes having physical resource blocks that can be allocated to M2M UEs or other specialized classes of UEs can be assigned. In addition, resources assigned to different classes of UEs can appear staggered with respect to one another, and may have different numbers of subframes of allocation. In the example illustrated in FIG. 6, the pattern would have to be designated separately for each class of UEs, e.g.:

a UE class 1 (CL1) pattern, specified as {offset with respect to super frame boundary osb_c1, number of subframes n_c1, periodicity of pattern p_c1, start PRB number sprb_c1, number of PRBs nprb_c1} a UE class 2 (CL2) pattern, specified as {offset with respect to super frame boundary osb_c2, number of subframes n_c2, periodicity of pattern p_c2, start PRB number sprb_c2, number of PRBs nprb_c2} etc.

Some classes of UEs may be capable of accessing control information that other classes cannot. FIG. 6 illustrates this, showing that class1 UEs cannot access the enhanced Physical Downlink Control Channel (EPDCCH) that is being specified for downlink control, for future releases of LTE. Uplink control may also be separated out from the Physical Uplink Control Channel (PUCCH) used by legacy or normal UEs. These characteristics are mentioned to illustrate variations on the main embodiment.

After creating one or more patterns of resources, a network node may signal the resource pattern to other network nodes. The network node may signal one pattern for each of several carrier frequencies, or even a plurality of patterns for the same carrier frequency. A given resource pattern can be applicable for all available radio resources, or it can be applicable to certain set of physical resources (e.g., only even subframes, only odd subframes, for certain group of RBs (0-24), etc.).

The resource pattern may be sent proactively, in some embodiments or instances, i.e., without receiving any request from the target node. A resource pattern may also be sent by the sending node upon receiving an explicit request from the target node or nodes. The target network node receiving the resource pattern may use it for scheduling resources to its own UEs as explained below.

In some embodiments, the signaling message exchanged with the neighbor base stations, which may use either the 3GPP-standardized X2 or S1 interfaces, for example, or which may use any other proprietary communication interface, contains information about the resources allocated to M2M, information indicating whether the sensor granted the resource is in coverage-enhancement mode or not, information defining a period of validity for the resource allocation, the modulation and coding scheme used in the allocated physical resource, and/or the need for protection from other cell interference. An example of such a message is illustrated in FIG. 7, which shows an example of an X2 or S1 message containing scheduling information regarding M2M traffic.

In some embodiments, the techniques described above are applied when resource allocation to M2M is done in a dynamic or semi-static manner. In some other embodiments, the techniques are applied when resources are allocated to M2M in a fixed static manner. In this case, the physical resources to be allocated to M2M devices once, at an initial configuration stage, may be the ones suffering the highest inter-system interference, for example.

A network node may also signal its own resource pattern and associated information to the UEs in the cell served by the network node. The network node may further signal one or more patterns used in neighboring cells to its UEs. The network node may signal the patterns for UEs in low-activity Radio Resource Control (RRC) states (e.g., idle state) and/or in high-activity RRC states (e.g., connected state) using broadcast or UE-specific signaling. The UE in these embodiments uses the patterns for one or more radio operation tasks, such as radio resource management, interference handling (e.g., interference reduction or mitigation), measurement control or adaptation, etc.

For example, the UE may adapt its receiver type depending upon the type of radio resource in a pattern. More specifically, the UE doing one or more radio measurements in subframes or RBs used for M2M UEs may use a baseline receiver, since M2M UEs use low date rate and interference is low in such subframes. In other subframes, the UE may use an enhanced or advanced receiver mode for doing measurements. For example, it will be appreciated that a baseline receiver mode may not mitigate interference from other UEs, while an enhanced receiver mode is capable of mitigating interference due to signals from other UEs. However the enhanced receiver mode is more complex, consumes more power, and involves more processing. Thus, it may be beneficial to selectively apply the receiver modes in dependence on the resource pattern received from the network node.

The UE can also use the neighbor cell patterns for mitigating inter-cell interference by selecting advanced receiver in subframes where neighbor cells are expected to have more interference, as depicted by their patterns. In yet another example, the UE may forward the received information about the patterns to other UEs, e.g., UEs which are direct device to device communication capable. The UE may also store the received pattern information and report the statistics to the network node which in turn use them for network planning, etc.

A network node receiving a resource pattern from a neighboring node can take the received resource pattern into account for scheduling its own UEs (e.g., M2M and normal UEs). The UEs can be scheduled to ensure that interference in neighbor cells is minimized, for instance. Note that the operation described here applies for either or both of uplink and downlink operation, as is the case for other scheduling operations discussed herein. While details of the scheduling approach may vary, these details do not change the main concepts proposed here.

In some systems, fewer than all of the network nodes and UEs may support capabilities for supporting operation related to pattern of resources for different types of UEs. For example all network nodes (such as base stations) may not be capable of creating a pattern of resources and/or using the pattern of resources for radio operations like scheduling, etc., as described above. In some embodiments of the present techniques, then, a network node signals its capability to another network node to indicate that it is capable of handling one or more patterns of radio resources for performing radio operations for M2M UEs and normal UEs. The signaled capability information may further specify one or more types of operations supported by the network node. Examples of operations that may be indicated in such a notification include:

the network node is capable of creating a pattern and using it for its own users;
  the network node is also capable of creating a pattern, using it for its own users and signaling it to other nodes (which may be network nodes and/or UEs);
  the network node is capable of using the pattern for specific purpose, e.g., scheduling of resources, interference management, e.g., power adjustment etc;
  the network node is capable of using the patterns of neighboring nodes for any one or more of the purpose above.

The radio network node may send the capability information to another network node in any of the following manners:

proactive reporting without receiving any explicit request from another network node (e.g., neighboring or any target network node);
  reporting upon receiving any explicit request from another network node (e.g., neighboring or any target network node).

If the reporting is performed upon receiving an explicit request, the explicit request can be sent to the radio network node by another network any time or at any specific occasion. For example the request for the capability reporting can be sent to the radio network node during initial setup, when the radio network node is upgraded (e.g., more radio units or transceivers, number of antennas in a radio unit are increased, new antennas modes are deployed, etc.).

Further, a UE that is capable of receiving and using one or more patterns of resources, as described above, may likewise inform the network node that it supports such capability. The UE may also include additional information in the capability message which may include an indication of one or more of that:
- the UE is capable of receiving and using only pattern of resources used in its serving cell;
- the UE is capable of receiving and using one or more patterns of resources used in one or more neighbor cells;
- the UE is capable of receiving and using only one pattern at a time;
- the UE is capable of receiving and using one or more patterns per carrier frequency for up to N frequencies at the same time;
- the UE is capable of using the pattern for certain tasks, e.g., for interference management, adaptation of receiver types, adaptation of measurement sampling for measuring signals for radio measurements, etc.

The acquired capability information may be used by the serving network node for taking one or more radio operation tasks or actions. Examples of radio operation tasks are taking a decision whether to send the pattern to the UE or not, whether to send only serving cell pattern or neighbor cell pattern or both.

The UE may send the capability information to the network node in any of the following manner:
- proactive reporting without receiving any explicit request from the network node (e.g., serving or any target network node);
- reporting upon receiving any explicit request from the network node (e.g., serving or any target network node)

If the reporting is performed upon receiving an explicit request, the explicit request can be sent to the UE by the network any time, or at any specific occasion. For example the request for the capability reporting can be sent to the UE during initial setup or after a cell change (e.g., handover, RRC connection re-establishment, RRC connection release with redirection, PCell change in carrier aggregation (CA), primary component carrier (PCC) change in PCC, etc.).

In the event of proactive reporting, the UE may report its capability during one or more of the following occasions:
- during initial setup or call setup, e.g., when establishing the RRC connection
- during cell change, e.g., handover, primary carrier change in multi-carrier operation, PCell change in multi-carrier operation, RRC re-establishment, RRC connection release with redirection, etc.

According to various embodiments of the presently disclosed techniques, the techniques described above are employed in systems where the M2M-type traffic is served by any variant of OFDM, CDMA, FBMC, or compressed sensing, combined with access technologies such as CDMA, OFDM, SC-FDMA technology, etc. In some embodiments, the radio access technology used to handle M2M-type traffic can be independent from the technology used for the physical resources granted to human-centric traffic.

Figure 8:
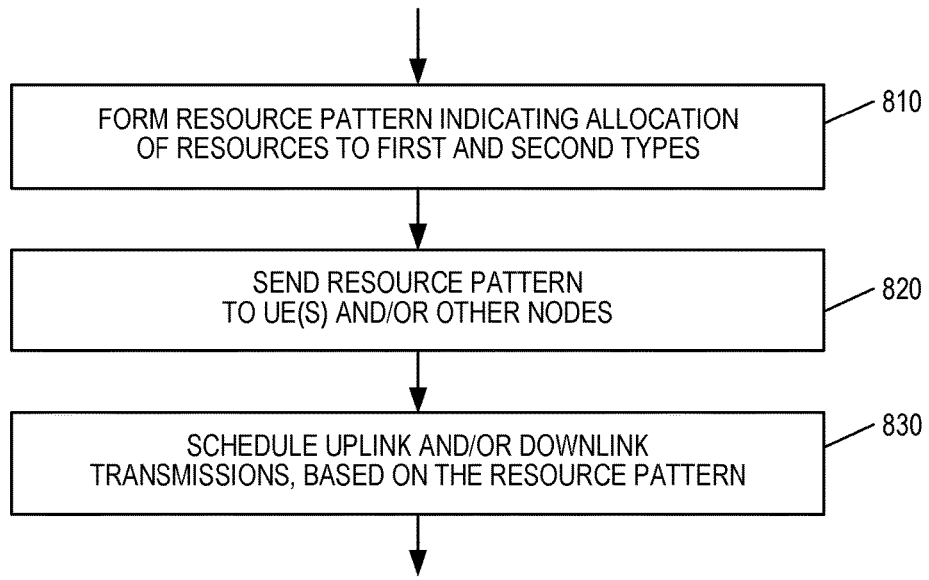

With the above detailed techniques in mind, it will be appreciated that FIG. 8 illustrates an example method suitable for implementation in a network node, such as the base station of FIG. 3 or the core network node shown in FIG. 4. As shown at block 810, the example method includes forming a first resource pattern, the first resource pattern indicating an allocation of first radio resources in a first cell, in the time domain, to a first type of wireless device and indicating an allocation of second radio resources in the first cell, in the time domain, to a second type of wireless device. Example patterns were described above. The resource pattern may include a sequence of data that corresponds to a particular pattern of resources, and may further include information that describes the pattern, e.g., indicating a sequence length, an applicability criterion, or the like, as was described above.

The example method further includes sending the first resource pattern to a second network node of the wireless communication system, or to least one wireless device, or to both, as shown at block 820. In some embodiments, as discussed in further detail below, the first type of wireless device consists of wireless devices that are capable of operating in an enhanced-coverage mode, while the second type of wireless device comprises wireless devices that do not support the enhanced-coverage mode. The wireless devices that are capable of operating in an enhanced-coverage mode may be machine-to-machine (M2M) wireless devices.

In some embodiments, the first resource pattern is used by the network node for scheduling uplink and/or downlink transmissions in the first cell for at least one wireless device of each type, as shown at block 830. In some of these embodiments, the network node receives a second resource pattern from a second network node of the wireless communication system, the second resource pattern indicating allocations, by the second network node, of radio resources in a second cell, in the time domain, to the first and second types of wireless device. In these embodiments, the scheduling of uplink and/or downlink resources may be at least partly based on the received second resource pattern.

In other embodiments, a similar second resource pattern is received from a second network node of the wireless communication system, with the second resource pattern similarly indicating allocations, by the second network node, of radio resources in a second cell, in the time domain, to the first and second types of wireless device. In these embodiments, however, the received second resource pattern, which may identify resource allocations in a closely neighboring cell, for example, is used to form the first resource pattern. This approach may be taken to reduce interference, for example.

Other factors may be used to form the first resource pattern, in various embodiments. For example, forming the first resource pattern may be at least partly based on an evaluation of traffic distribution among the first and second types of wireless device. Forming the first resource pattern may comprise allocating radio resources to the first type of wireless device according to the proportion of wireless devices of the first type among the wireless devices of the first and second types, in some embodiments. Further, forming the first resource pattern may be at least partly based on an evaluation of expected signal quality for one or more of the radio resources. For example, in some embodiments where the first type of wireless device consists of wireless devices that are capable of supporting an enhanced-coverage mode and the second type of wireless device includes wireless devices that do not support the enhanced-coverage mode, forming the first resource pattern may comprise allocating radio resources expected to have the lowest signal quality for one or more of the wireless devices to the first type of wireless device, i.e., to the devices that support the enhanced-coverage mode and are thus best able to handle the lower signal quality.

Figure 9:
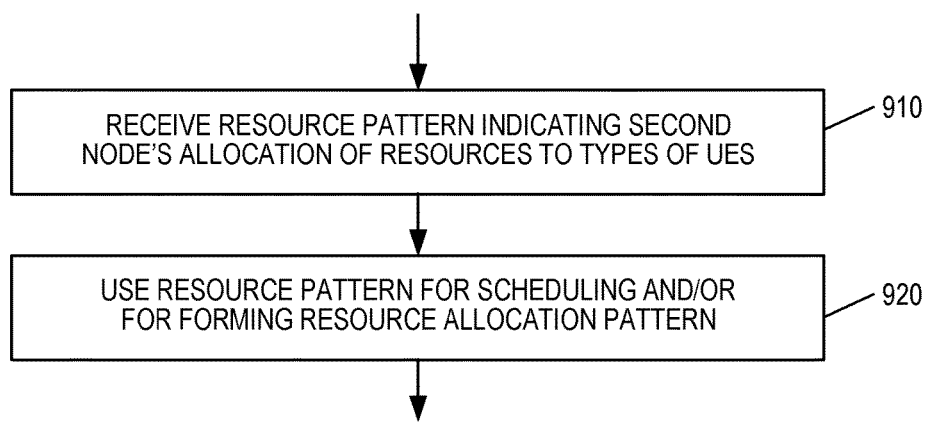

FIG. 9 illustrates an example of another method carried out in a network node, such as either of the network nodes shown in FIGS. 3 and 4. As shown at block 910, the illustrated method begins with receiving, from another network node, a resource pattern indicating an allocation by the other network node of radio resources in a first cell to first and second types of UEs. The method continues, as shown at block 920, with using the received resource pattern for scheduling uplink and/or downlink transmissions for at least one wireless device of each type, based at least in part on the received resource pattern. Once again, the first type of wireless device may consist of wireless devices that are capable of operating in an enhanced-coverage mode, while the second type of wireless device includes wireless devices that do not support the enhanced-coverage mode.

In some embodiments operating according to this second example method, the network node forms a second resource pattern, the second resource pattern indicating allocations, by the network node, of radio resources in a second cell, in the time domain, to the first and second types of wireless device. In these embodiments, the forming of the second resource pattern is based at least partly on the received first resource pattern. In some of these embodiments, forming the second resource pattern is further based at least partly on an evaluation of traffic distribution among the first and second types of wireless device and/or is further based at least partly on an evaluation of expected signal quality for one or more of the resources.

Figure 10:
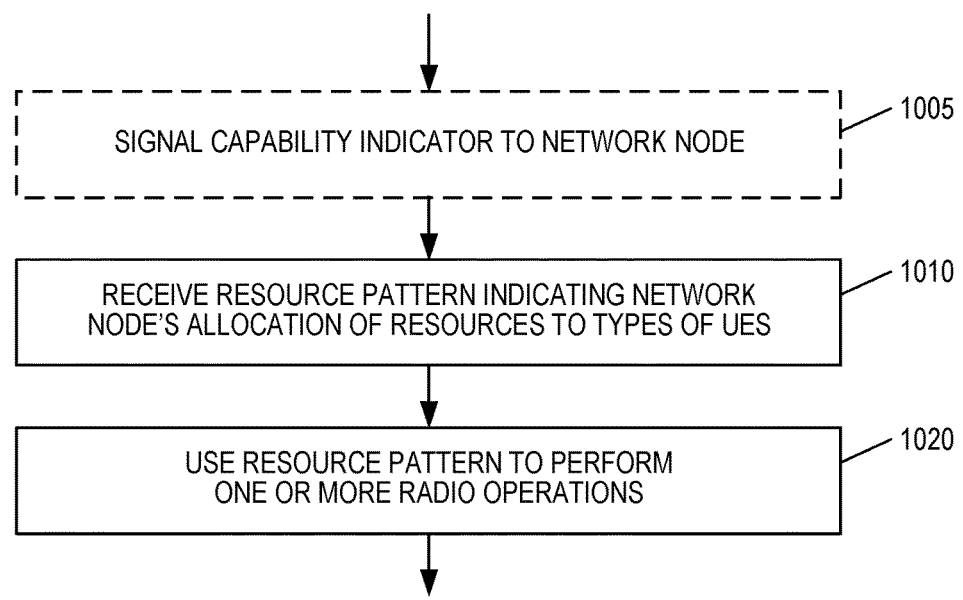

Still another example method is suitable for being carried out in a wireless device, such as an LTE UE, and is illustrated in FIG. 10. As shown at block 1010, this example method includes receiving a first resource pattern from a network node, the first resource pattern indicating an allocation in a cell by the network node of first radio resources in the time domain to the first type of wireless device and indicating an allocation in the cell of second radio resources in the time domain to the second type of wireless device. The method continues, as shown at block 1020, with performing one or more radio operations based on the first resource pattern and based on the type of the wireless device, such as for adjusting DRX/DTX cycles, selectively employing an advanced receiver mode for use in particular resources corresponding to the resource pattern, selectively implementing interference-mitigation techniques based on the resource pattern, etc. Note that one or more of these operations may be based further on one or more other resource patterns, such as a resource pattern specifying the allocation of resources by a neighboring node.

In some embodiments, a wireless device carrying out the example method described above signals a capability indicator to the network node, the capability indicator indicating that the wireless device is capable of handling a resource pattern that indicates an allocation in a cell by the network node of first set of radio resources in the time domain to the first type of wireless device and that indicates an allocation in the cell of second set of radio resources in the time domain to the second type of wireless device. This is shown at block 1005 of FIG. 10.

It should be understood that the methods illustrated in FIGS. 8, 9, and 10 are examples of the techniques described more fully above. Each of these methods may be modified according to any of the variations and details discussed above. Further, it should be appreciated that a single network node may implement one or several of these methods.

The methods illustrated in FIGS. 5 and 8-10, and variants thereof, may be implemented using the processing circuits illustrated in FIGS. 2, 3, and 4, where the processing circuits are configured, e.g., with appropriate program code stored in memory circuits 36, 46, and/or 56, to carry out the operations described above. While some of these embodiments are based on a programmed microprocessor or other programmed processing element, it will be appreciated that not all of the steps of these techniques are necessarily performed in a single microprocessor or even in a single module. Embodiments of the presently disclosed techniques further include computer program products for application in a user terminal as well as corresponding computer program products for application in a base station apparatus.

Figure 11:
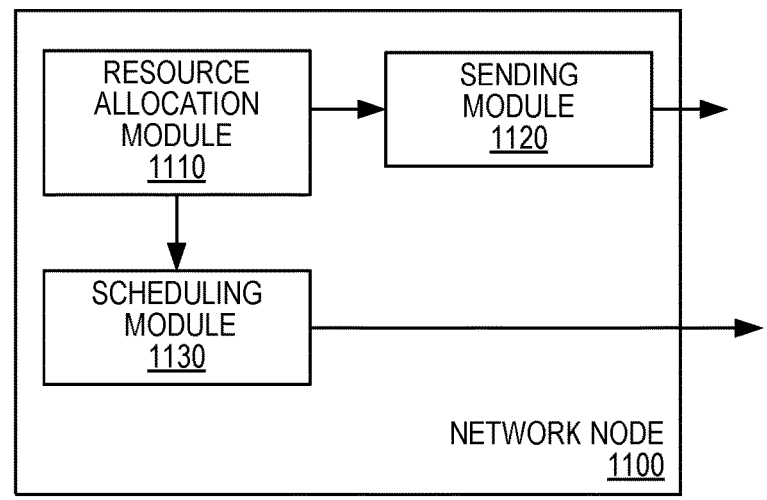
Figure 12:
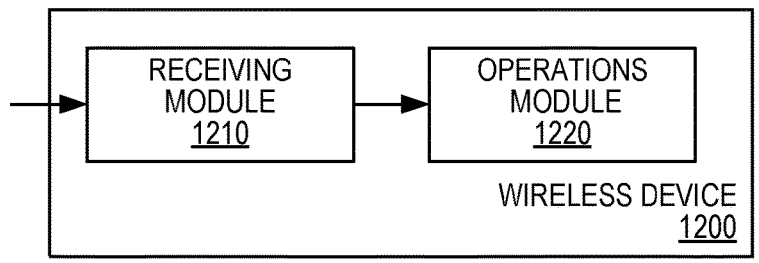

It will further be appreciated that various aspects of the above-described embodiments can be understood as being carried out by functional "modules," which may be program instructions executing on an appropriate processor circuit, hard-coded digital circuitry and/or analog circuitry, or appropriate combinations thereof. FIGS. 11 and 12 thus illustrate an example network node 1100 and wireless device 1200, respectively, where the details of the circuits therein are represented as functional modules. It will be appreciated that node 1100 and wireless device 1200 may be implemented using hardware architectures like those shown in FIGS. 2 and 3, in some embodiments.

FIG. 11 thus illustrates an example network node 1100 that comprises a resource allocation module 1110 adapted to form a first resource pattern, the first resource pattern indicating an allocation in a cell of first radio resources in the time domain to the first type of wireless device and indicating an allocation in the cell of second radio resources in the time domain to the second type of wireless device. The network node 1100 further comprises a sending module 1120 adapted to send the first resource pattern to a second network node of the wireless communication system, or to least one wireless device, or to both. The illustrated network node 1100 still further includes a scheduling module 1130 adapted to schedule uplink and/or downlink transmissions for at least one wireless device of each type, using the first resource pattern. It will be appreciated that all of the variations described above, e.g., in connection with describing the methods illustrated in FIGS. 5, 8, and 9, are applicable to the network node 1100 shown in FIG. 11.

Similarly, FIG. 12 provides an alternative view of a wireless device 1200, which is adapted to operate in a wireless communication network and which includes a receiving module 1210 adapted to receive a first resource pattern from a network node, the first resource pattern indicating an allocation in a cell by the network node of first radio resources in the time domain to the first type of wireless device and indicating an allocation in the cell of second radio resources in the time domain to the second type of wireless device. The wireless device 1200 further includes an operations module 1120, which is adapted to perform one or more radio operations based on the first resource pattern and based on the type of the wireless device, such as adjusting a discontinuous receive (DRX) cycle or discontinuous transmit (DTX) cycle, or both, based on the first resource pattern and based on the type of the wireless device. Again, the variations described above, including those discussed in connection with the method shown in FIG. 10, are equally applicable to the wireless device 1200 of FIG. 12.

The techniques, devices, and systems described herein may provide any of several advantages, such as:
  allowing the coexistence of M2M traffic type together with human-centric type of traffic in a very flexible way;
  inter-cell interference due to simultaneous operation of M2M traffic and human type traffic in neighboring cells is reduced or minimized;
  enabling neighboring network nodes to adapt their scheduling to enable coexistence between the operation of the M2M traffic and human traffic types;

avoiding the need for having a dedicated carrier for M2M traffic, which is mostly infrequent—in this way, spectrum is used more efficiently;

resource sharing between M2M users and normal users can be semi-statically adjusted in response to change in their traffic distribution over time.

Modifications and other variants of the described embodiment(s) will come to mind to one skilled in the art having the benefit of the teachings presented in the foregoing descriptions and the associated figures. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

ABBREVIATIONS

3GPP Third Generation Partnership Project
BPSK Binary Phase-Shift Keying
CA Carrier Aggregation
CDMA Code-Division Multiple Access
CPE Customer Premises Equipment
CSI Channel State Information
CQI Channel Quality Information
DAS Distributed Antenna System
DRX Discontinuous Receive
DTX Discontinuous Transmit
EARFCN EUTRA Absolute Radio Frequency Channel Number
eNB evolved Node B
EPDCCH enhanced Physical Downlink Control Channel
E-SMLC Evolved Serving Mobile Location Centre
EUTRA Evolved UMTS Terrestrial Radio Access
EUTRAN Evolved UMTS Terrestrial Radio Access Network
EVM Error Vector Magnitude
FBMC Filter Bank Multicarrier
LEE Laptop-Embedded Equipped
LME Laptop-Mounted Equipment
LTE Long Term Evolution
M2M Machine to Machine
MDT Minimization of Drive Tests
MME Mobility Management Entity
MSR Multi-Standard Radio
MTC Machine Type Communications
O&M Operations & Maintenance
OFDM Orthogonal Frequency Division Mode
OSS Operations Support System
PCC Primary Component Carrier
PDCCH Physical Downlink Control Channel
PDSCH Physical Downlink Shared Channel
PUCCH Physical Uplink Control Channel
PUSCH Physical Uplink Shared Channel
PMI Precoding Matrix Indicator
PRB Physical Resource Block
QPSK Quadrature Phase-Shift Keying
RACH Random Access Channel
RAN Radio Access Network
RB Resource Block
RI Rank Indicator
RRC Radio Resource Control
RRH Remote Radio Head
RRU Remote Radio Unit
RSRP Received Signal Reference Power
RSRQ Received Signal Reference Quality
SC-FDMA Single-Carrier Frequency-Division Multiple Access
SFN System Frame Number
SGW Serving Gateway
SINR Signal-to-Interference-Plus-Noise Ratio
SON Self-Organizing Network
TTI Transmission Time Interval
UE User Equipment
USB Universal Serial Bus
UTRA Universal Terrestrial Radio Access
UTRAN Universal Terrestrial Radio Access Network
WCDMA Wideband Code-Division Multiple Access

What is claimed is:

1. A method, in a first network node of a wireless communication system, of allocating radio resources in a first cell among at least first and second types of wireless devices, the method comprising:

forming a first resource pattern, the first resource pattern indicating an allocation of first radio resources in the first cell, in the time domain, to the first type of wireless device and indicating an allocation of second radio resources in the first cell, in the time domain, to the second type of wireless device, wherein the first type of wireless device comprises wireless devices that operate in an enhanced-coverage mode and the second type of wireless device comprises wireless devices that do not support the enhanced-coverage mode;

sending the first resource pattern to a second network node of the wireless communication system, or to at least one of the first type and second type of wireless device, or to both; and receiving a capability indicator from the first type of wireless device, wherein the capability indicator indicates that the first type of wireless device is capable of handling the first resource pattern indicating an allocation in the first cell by the first network node of a first set of radio resources in the time domain to the first type of wireless device and indicating an allocation in the first cell of a second set of radio resources in the time domain to the second type of wireless device, wherein the received capability indicator includes capability information that specifies one or more types of operations supported by the first network node thereby to support handling of the first resource pattern.

2. The method of claim 1, wherein the first type of wireless device consists of wireless devices operating in an enhanced-coverage mode and the second type of wireless device comprises wireless devices operating in normal-coverage mode.

3. The method of claim 1, the method further comprising scheduling uplink and/or downlink transmissions in the first cell for at least one wireless device of each type, using the first resource pattern.

4. The method of claim 3, the method further comprising receiving a second resource pattern from the second network node of the wireless communication system, the second resource pattern indicating allocations, by the second network node, of radio resources in a second cell, in the time domain, to the first and second types of wireless device, wherein said scheduling uplink and/or downlink resources is based at least partly on the received second resource pattern.

5. The method of claim 1, the method further comprising receiving a second resource pattern from the second network node of the wireless communication system, the second resource pattern indicating allocations, by the second network node, of radio resources in a second cell, in the time domain, to the first and second types of wireless device, wherein said forming the first resource pattern is based at least partly on the received second resource pattern.

6. The method of claim 1, wherein forming the first resource pattern is based at least partly on an evaluation of traffic distribution among the first and second types of wireless device.

7. The method of claim 1, wherein forming the first resource pattern is based at least partly on an evaluation of expected signal quality for one or more of the radio resources.

8. The method of claim 7, wherein forming the first resource pattern comprises allocating radio resources expected to have the lowest signal quality for one or more of the wireless devices to the first type of wireless device.

9. The method of claim 1, wherein forming the first resource pattern comprises allocating radio resources to the first type of wireless device according to the proportion of wireless devices of the first type among the wireless devices of the first and second types.

10. A method, in a second network node of a wireless communication system, of managing radio resource allocations to at least first and second types of wireless devices, the method comprising:
receiving, from a first network node in the wireless communication system, a first resource pattern, the first resource pattern indicating an allocation in a first cell by the first network node of first radio resources in the time domain to the first type of wireless device and indicating an allocation in the first cell of second radio resources in the time domain to the second type of wireless device, wherein the first type of wireless device comprises wireless devices that operate in an enhanced-coverage mode and the second type of wireless device comprises wireless devices that do not support the enhanced-coverage mode;
scheduling uplink and/or downlink transmissions for at least one wireless device of each type, based at least in part on the first resource pattern; and
receiving a capability indicator from the first type of wireless device, wherein the capability indicator indicates that the first type of wireless device is capable of handling the first resource pattern indicating an allocation in the first cell by the first network node of first set of radio resources in the time domain to the first type of wireless device and indicating an allocation in the first cell of second set of radio resources in the time domain to the second type of wireless device, wherein the received capability indicator includes capability information that specifies one or more types of operations supported by the first network node thereby to support handling of the first resource pattern.

11. The method of claim 10, further comprising forming a second resource pattern, the second resource pattern indicating allocations, by the second network node, of radio resources in a second cell, in the time domain, to the first and second types of wireless device, wherein said forming of the second resource pattern is based at least partly on the received first resource pattern.

12. The method of claim 11, wherein forming the second resource pattern is further based at least partly on an evaluation of traffic distribution among the first and second types of wireless device.

13. The method of claim 11, wherein forming the second resource pattern is based at least partly on an evaluation of expected signal quality for one or more of the resources.

14. A method in a wireless device operating in a wireless communication system, wherein the wireless device is either of a first type or a second type, the method comprising:
receiving a first resource pattern from a network node, the first resource pattern indicating an allocation in a first cell by the network node of first radio resources in the time domain to the first type of wireless device and indicating an allocation in the first cell of second radio resources in the time domain to the second type of wireless device, wherein the first type of wireless device comprises wireless devices that operate in an enhanced-coverage mode and the second type of wireless device comprises wireless devices that do not support the enhanced-coverage mode;
performing one or more radio operations based on the first resource pattern and based on the type of the wireless device; and
signaling a capability indicator to the network node, the capability indicator indicating that the first type of wireless device is capable of handling the first resource pattern that indicates an allocation in the first cell by the network node of first set of radio resources in the time domain to the first type of wireless device and that indicates an allocation in the first cell of second set of radio resources in the time domain to the second type of wireless device, wherein the signaled capability indicator includes capability information that specifies one or more types of operations supported by the network node thereby to support handling of the first resource pattern.

15. The method of claim 14, wherein performing one or more radio operations based on the first resource pattern and based on the type of the wireless device comprises adjusting a discontinuous receive (DRX) cycle or discontinuous transmit (DTX) cycle, or both.

16. The method of claim 14, wherein performing one or more radio operations based on the first resource pattern and based on the type of the wireless device comprises:
interference handling or mitigation;
performing a measurement;
adaptation of receiver type; and
transmitting information about the received first resource pattern to another wireless device.

17. A first network node configured to allocate radio resources among at least first and second types of wireless devices, the first network node comprising a radio transceiver configured to communicate with wireless devices and further comprising a processing circuit configured to:
form a first resource pattern, the first resource pattern indicating an allocation in a first cell of first radio resources in the time domain to the first type of wireless device and indicating an allocation in the first cell of second radio resources in the time domain to the second type of wireless device, wherein the first type of wireless device comprises wireless devices that operate in an enhanced-coverage mode and the second type of wireless device comprises wireless devices that do not support the enhanced-coverage mode;
send the first resource pattern to a second network node of the wireless communication system, or to a wireless device, or to both; and
receive a capability indicator from the first type of wireless device, wherein the capability indicator indicates that the first type of wireless device is configured to handle the first resource patterns allocating radio resources in the first cell by wireless device type, wherein the received capability indicator includes capability information that specifies one or more types of operations supported by the first network node thereby to support handling of the first resource pattern.

18. The first network node of claim 17, wherein the processing circuit is further configured to schedule uplink and/or downlink transmissions for at least one wireless device of each type, using the first resource pattern.

19. The first network node of claim 18, wherein the processing circuit is further configured to receive a second resource pattern from the second network node of the wireless communication system, the second resource pattern indicating allocations in a second cell, by the second network node, of radio resources in the time domain to the first and second types of wireless device, and wherein the processing circuit is configured to perform said scheduling based at least partly on the received second resource pattern.

20. The first network node of claim 17, wherein the processing circuit is further configured to receive a second resource pattern from the second network node of the wireless communication system, the second resource pattern indicating allocations in a second cell, by the second network node, of radio resources in the time domain to the first and second types of wireless device, wherein the processing circuit is configured to perform said forming based at least partly on the received second resource pattern.

21. The first network node of claim 17, wherein the processing circuit is configured to perform said forming based at least partly on an evaluation of traffic distribution among the first and second types of wireless device.

22. The first network node of claim 17, wherein the processing circuit is configured to perform said forming based at least partly on an evaluation of expected signal quality for one or more of the resources.

23. The first network node of claim 22, wherein the processing circuit is configured to allocate resources expected to have the lowest signal quality for one or more of the wireless devices to the first type of wireless device.

24. The method of claim 17, wherein the processing circuit is configured to allocate radio resources to the first type of wireless device according to the proportion of wireless devices of the first type.

25. A network node of a wireless communication system, for managing radio resource allocations to at least first and second types of wireless devices, the network node comprising a radio transceiver configured to communicate with wireless devices and further comprising a processing circuit configured to:
receive, from a first network node in the wireless communication system, a first resource pattern, the first resource pattern indicating an allocation in a first cell by the first network node of first radio resources in the time domain to the first type of wireless device and indicating an allocation in the first cell of second radio resources in the time domain to the second type of wireless device, wherein the first type of wireless device comprises wireless devices that operate in an enhanced-coverage mode and the second type of wireless device comprises wireless devices that do not support the enhanced-coverage mode;
schedule uplink and/or downlink transmissions for at least one wireless device of each type, based at least in part on the first resource pattern; and
receive a capability indicator from the first type of wireless device, wherein the capability indicator indicates that the first type of wireless device is configured to handle the first resource patterns allocating radio resources in the first cell by wireless device type, wherein the received capability indicator includes capability information that specifies one or more types of operations supported by the first network node thereby to support handling of the first resource pattern.

26. The network node of claim 25, wherein the processing circuit is further configured to form a second resource pattern, based at least partly on the received first resource pattern, the second resource pattern indicating allocations, by a second network node, of radio resources in a second cell, in the time domain, to the first and second types of wireless device.

27. The network node of claim 26, wherein the processing circuit is configured to form the second resource pattern based at least partly on an evaluation of traffic distribution among the first and second types of wireless device.

28. The network node of claim 26, wherein the processing circuit is configured to form the second resource pattern based at least partly on an evaluation of expected signal quality for one or more of the resources.

29. A wireless device configured to operate in a wireless communication network, the wireless device comprising a radio transceiver configured to communicate with a network node and further comprising a processing circuit configured to:
receive a first resource pattern from a network node, the first resource pattern indicating an allocation in a first cell by the network node of first radio resources in the time domain to the first type of wireless device and indicating an allocation in the first cell of second radio resources in the time domain to the second type of wireless device, wherein the first type of wireless device comprises wireless devices that operate in an enhanced-coverage mode and the second type of wireless device comprises wireless devices that do not support the enhanced-coverage mode;
adjust a discontinuous receive (DRX) cycle or discontinuous transmit (DTX) cycle, or both, based on the first resource pattern and based on the type of the wireless device; and
signal a capability indicator to the network node, wherein the capability indicator indicates that the first type of wireless device is configured to handle the first resource patterns allocating radio resources in the cell by wireless device type, wherein the signaled capability indicator includes capability information that specifies one or more types of operations supported by the network node thereby to support handling of the first resource pattern.

30. The wireless device of claim 29, wherein the processing circuit is configured to adjust a discontinuous receive (DRX) cycle or discontinuous transmit (DTX) cycle, or both, based on the first resource pattern and based on the type of the wireless device.

* * * * *